United States Patent
Salasny, Sr.

(10) Patent No.: US 6,808,096 B1
(45) Date of Patent: Oct. 26, 2004

(54) VEHICULAR WINDSHIELD BAG MOUNTING ASSEMBLY AND MOUNTED WINDSHIELD BAG

(76) Inventor: James Stephen Salasny, Sr., 75 Harvington Rd., Tonawanda, NY (US) 14150

( * ) Notice: Subject to any disclaimer, the term of this patent is extended or adjusted under 35 U.S.C. 154(b) by 0 days.

(21) Appl. No.: 10/445,083

(22) Filed: May 27, 2003

(51) Int. Cl.$^7$ ................................................ B62J 11/00
(52) U.S. Cl. ..................... 224/413; 248/208; 280/288.7
(58) Field of Search ........................... 248/208, 95, 97, 248/99; 296/96.21; 280/288.4; 224/413, 412

(56) References Cited

U.S. PATENT DOCUMENTS

| | | | | |
|---|---|---|---|---|
| 2,675,266 A | * | 4/1954 | Comiskey, Sr. | 296/78.1 |
| 4,313,548 A | * | 2/1982 | Edelson | 224/438 |
| 4,542,839 A | * | 9/1985 | Levine et al. | 224/431 |
| 4,669,690 A | * | 6/1987 | McEniry | 248/101 |
| 4,750,695 A | * | 6/1988 | Greenhouse | 248/99 |
| 4,798,318 A | * | 1/1989 | Irwin | 224/438 |
| 4,800,664 A | * | 1/1989 | Marstall | 40/661 |
| 4,998,695 A | * | 3/1991 | Nobis | 248/101 |
| 5,377,941 A | * | 1/1995 | Har et al. | 248/101 |
| 5,881,936 A | * | 3/1999 | Li | 224/413 |
| 6,176,339 B1 | * | 1/2001 | Reichardt | 180/219 |
| 6,647,121 B2 | * | 11/2003 | Stanberry et al. | 381/86 |
| 2003/0201292 A1 | * | 10/2003 | Lovett | 224/585 |
| 2004/0031833 A1 | * | 2/2004 | Alderman | 224/413 |

* cited by examiner

Primary Examiner—Anita King
Assistant Examiner—Amy J. Sterling
(74) Attorney, Agent, or Firm—Ashley J. Wells

(57) ABSTRACT

A vehicular windshield bag mounting assembly which permits mounting of a windshield bag having a generally planar structure onto a support bar of a curved windshield of a vehicle while maintaining generally planar structure of the bag so that warping of the bag is substantially prevented, includes a bag spacer having a curved side surface which engages the support bar of the windshield and a flat side surface; a backer plate which is flat, which is inserted into the windshield bag for support, and which is attached to the flat side surface of the bag spacer; and fastening devices for attaching the backer plate to the flat side surface of the bag spacer, and for attaching the bag spacer to the support bar of the curved windshield. A mounted vehicular windshield bag includes a windshield bag having a generally planar structure; and the mounting assembly.

12 Claims, 3 Drawing Sheets

VEHICULAR WINDSHIELD BAG MOUNTING ASSEMBLY AND MOUNTED WINDSHIELD BAG

BACKGROUND OF THE INVENTION

1. Field of the Invention

This invention relates to a mounting means for a vehicular windshield bag and to a windshield bag mounted onto a vehicle's windshield employing the mounting means. More particularly, this invention relates to a mounting assembly which includes a windshield bag spacer and to the mounted windshield bag.

2. Description of the Related Art

Windshields of vehicles open to the environment, such as motorcycles, snowmobiles, all terrain vehicles, and boats may be fitted with a windshield bag mounted on the driver's side of the windshield for housing convenience items a driver would like to have handy, for example, sunglasses, sunscreen lotion, tissues, keys, and small tools. Such windshield bags are generally mounted onto a support member of the windshield and are positioned so as to minimize obstruction of the driver's view of the terrain ahead.

Windshields of such vehicles are typically curved to provide wind deflection with minimal impact on the forward motion of the vehicle in use. At least one windshield support member is provided as horizontal support for the curved windshield approximately at its center for stability. The support member or members follow the horizontal contour of the curved windshield and are attached to the windshield by screws or bolts. The support members are typically curved metal strips made of stainless steel or other metal which has been plated, such as with chrome, or painted. Gaskets for weather- and shock-proofing may be provided between the windshield and the support member(s).

Windshield bags are generally made of weather resistant materials, such as leather, vinyl, and nylon. The bags generally include a flap provided with a closure means, such as a turn clasp, and conventional bags have a small metal piece with center hole riveted to the back of the bag for mounting purposes. For example, conventional bags are mounted by removing one of the windshield support member fasteners, generally the center fastener, re-inserting the fastener through the center hole of the small metal piece from the inside or the outside of the bag, followed by reattachment of the fastener to the windshield support member. Such a small metal piece typically measures about 25 mm by 50 mm and has a thickness sufficient for this purpose ranging upwardly from about two mm. The dimensions of the metal piece are purposely kept small so as to permit conformation of the metal piece to the curve of the windshield.

After mounting, the windshield bag itself generally warps to conform to the curve of the windshield as well and herein lies the problem which the present invention addresses. Conformational warping of the windshield bag makes the bag more difficult to open by means of the turn clasp provided on the flap, more susceptible to water getting into the bag so that the contents are undesirably wetted, and less pleasing aesthetically.

Indeed, over time the creases and folds introduced by warping of the bag cause the material of the bag to crack and otherwise age and become unsightly, particularly if the bag is made of leather or vinyl, so that the useable life of the bag is lessened and the expense of replacement becomes necessary.

Accordingly, it is an object of the present invention to provide a vehicular windshield bag mounting assembly which permits mounting of a generally planar windshield bag onto a curved windshield while maintaining the generally planar structure of the bag so that warping of the bag is substantially prevented and the useful lifetime is substantially extended by up to about ten fold.

It is a further object of the present invention to provide a mounted vehicular windshield bag in which the generally planar structure of the windshield bag is maintained so that warping of the bag is substantially prevented and the useful lifetime is substantially extended by up to about ten fold.

SUMMARY OF THE INVENTION

These and other objects of the invention are accomplished by providing a vehicular windshield bag mounting assembly which permits mounting of a windshield bag having a generally planar structure onto a support bar of a curved windshield of a vehicle while maintaining the generally planar structure of the bag so that warping of the bag is substantially prevented. The vehicular windshield bag mounting assembly comprises a bag spacer having a curved side surface which engages the support bar of the curved windshield in use and a flat side surface; a backer plate which is flat, which is inserted into a windshield bag in use to support the windshield bag, and which is attached to the flat side surface of the bag spacer; and fastening means for attaching the backer plate to the flat side surface of the bag spacer, and for attaching the bag spacer to the support bar of the curved windshield.

The bag spacer and the backer plate are provided with respective pluralities of through holes through which fastening means extend. The fastening means may be at least one device selected from the group consisting of screws and bolts. The fastening means may be a plurality of machine screws.

The bag spacer may be provided with a plurality of through cuts which extend from the curved side surface through the flat side surface in order to reduce the weight of the bag spacer. The bag spacer includes a top surface and a bottom surface, and a plurality of weep holes may be provided in the bottom surface of the bag spacer through centers of respective ones of the plurality of through cuts for water drainage.

The bag spacer includes a top surface and a bottom surface, and respective flange portions may be provided on the top surface and on the bottom surface which extend from the curved side surface of the bag spacer toward the support bar of the windshield in use so that the flange portions straddle the support bar to provide positioning stability.

The fastening means for attaching the backer plate to the flat side surface of the bag spacer may be different from the fastening means which fastens the bag spacer to the support bar of the curved windshield in use. The fastening means which fastens the bag spacer to the support bar of the curved windshield in use may be one of screws or bolts which extend from the support bar.

The vehicular windshield bag mounting assembly may further comprise a modified shoulder bolt having a head provided with a hexagonal recess and a longitudinal threaded bore defined there through. The modified shoulder bolt is accommodated substantially within the bag spacer for fastening the bag spacer to a threaded fastener which extends from the support bar of the windshield in use. The bag spacer then may further comprise a notch defined in the curved side surface at a center portion thereof and a central through bore which extends from the curved side surface through the flat side surface of the bag spacer, which has a diameter effective to receive the modified shoulder bolt and a counterbore provided in the flat side surface which at least partially receives the head of the modified shoulder bolt.

A mounted vehicular windshield bag which permits mounting of a windshield bag having a generally planar structure onto a support bar of a curved windshield of a vehicle while maintaining the generally planar structure of the windshield bag so that warping of the bag is substantially prevented, comprises a windshield bag having a generally planar structure; and either embodiment of the vehicular windshield bag mounting assembly described above.

DETAILED DESCRIPTION OF THE INVENTION

Figure 1:
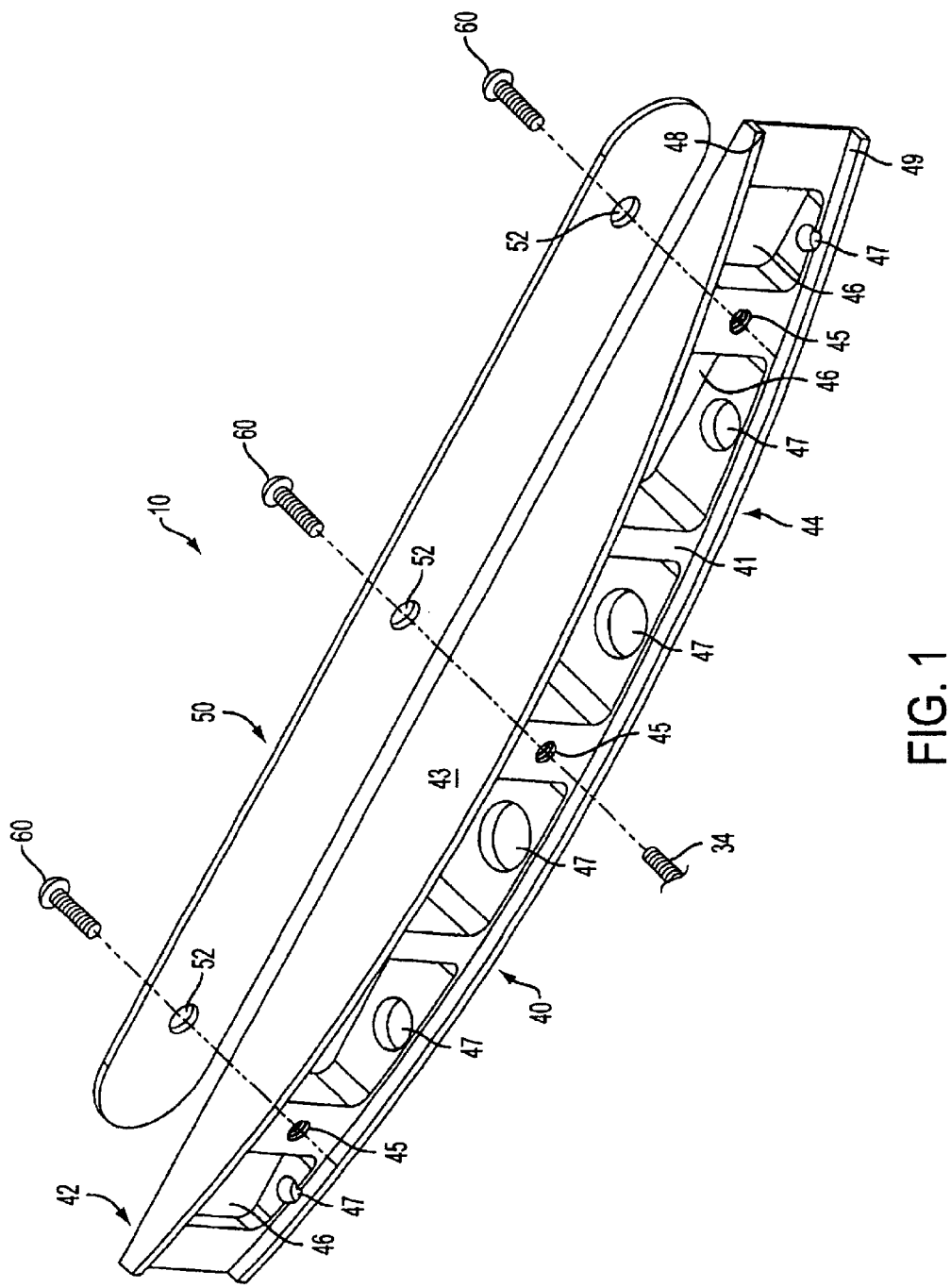
FIG. 1 is an isometric break away view of a mounting assembly according to the invention including a bag spacer, a backer plate, and fastening means.
Figure 2:
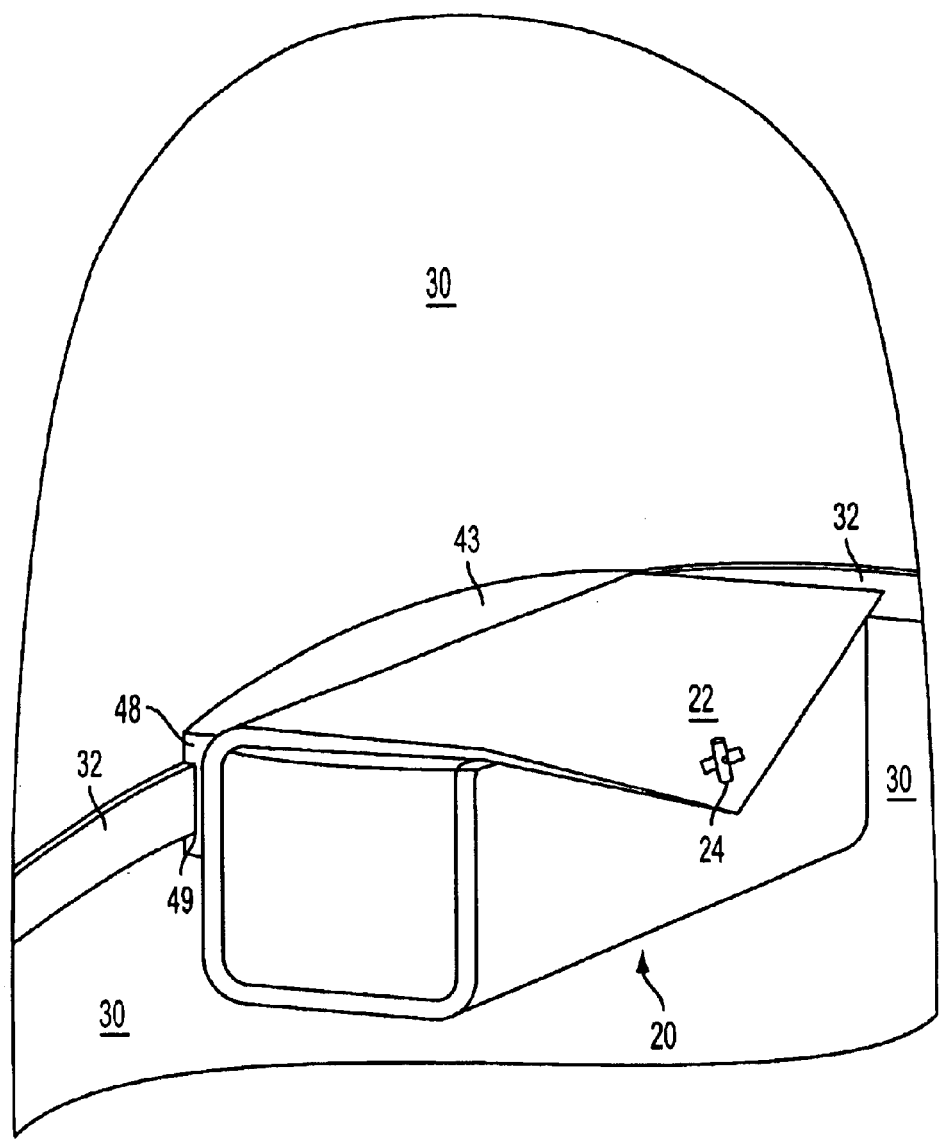
FIG. 2 is a partial isometric view showing the interior of a curved windshield of a vehicle, a windshield support bar, and a windshield bag mounted onto the support bar using the mounting assembly of FIG. 1.

FIGS. 1 and 2 illustrate a first embodiment of the invention. A vehicular windshield bag mounting assembly 10 for mounting a windshield bag 20 onto a vehicle windshield 30 includes a bag spacer 40 and a backer plate 50 which are shown in FIG. 1. A windshield bag 20 is shown in FIG. 2 and is shown with flap 22 and clasp 24 which may be a turn clasp or any other suitable clasp. Windshield bag 20 is supported by backer plate 50 from within the bag 20. Backer plate 50 is fastened onto bag spacer 40 with fastening means 60 to form mounting assembly 10. Mounting assembly 10 is attached to a support bar 32 of windshield 30 (see FIG. 2) with fastening means 34, such as a screw or bolt, shown in FIG. 1.

Bag spacer 40 mounts onto a support bar 32 of vehicle windshield 30 (see FIG. 2) and has a curved side surface 41 having a radius which matches that of the support bar 32 and the windshield 30. Bag spacer 40 additionally has a flat side surface 42 which receives and supports the backer plate 50. Bag spacer 40 additionally has a top surface 43 shown as being flat in FIG. 1 and a bottom surface 44 similarly inferentially shown as being flat in FIG. 1. While such flat surfaces make production by machining easier, other surface orientations are contemplated as well. Bag spacer 40 is provided with a plurality of through holes 45 which are threaded (see FIG. 1). The center through hole 45 receives two fasteners, one from each end. A fastener 34 extends from the center of the windshield support bar 32 and fastens the bag spacer 40 to the support bar 32. A plurality of fasteners 60, for example, bolts or screws, such as machine screws, preferably phillips pan headed machine screws, which are preferably made of stainless steel, attach the windshield bag 20 and the backer plate 50 to the bag spacer 40.

The bag spacer 40 may be machined from an aluminum billet or may be molded and has specifications suitable for the windshield and the windshield bag to be mounted. The bag spacer 40 may be advantageously chrome plated so as to blend with the aesthetic appearance of the vehicle. Alternatively, the bag spacer 40 may be provided with a baked-on paint finish such as by powder coating using conventional powder spray and baking techniques. Such bag spacers 40 are then easier to clean and do not rust.

It is advantageous to make the bag spacer 40 as light weight as possible, for example, about 4 to 6 ounces, and, for this purpose, a plurality of through cuts 46 may be machined or molded into bag spacer 40 to extend from the curved side surface 41 and through to the flat side surface 42 as shown in FIG. 1. It is additionally advantageous to machine or mold a plurality of weep holes 47 into the bottom 44 of bag spacer 40 within the centers of respective through cuts 46. The plurality of weep holes 47 advantageously permits discharge of water to mitigate moisture damage to the windshield bag 20 and to surrounding metal parts. The center placement of weep holes 47 advantageously maintains maximum strength and placement symmetry.

Figure 3:
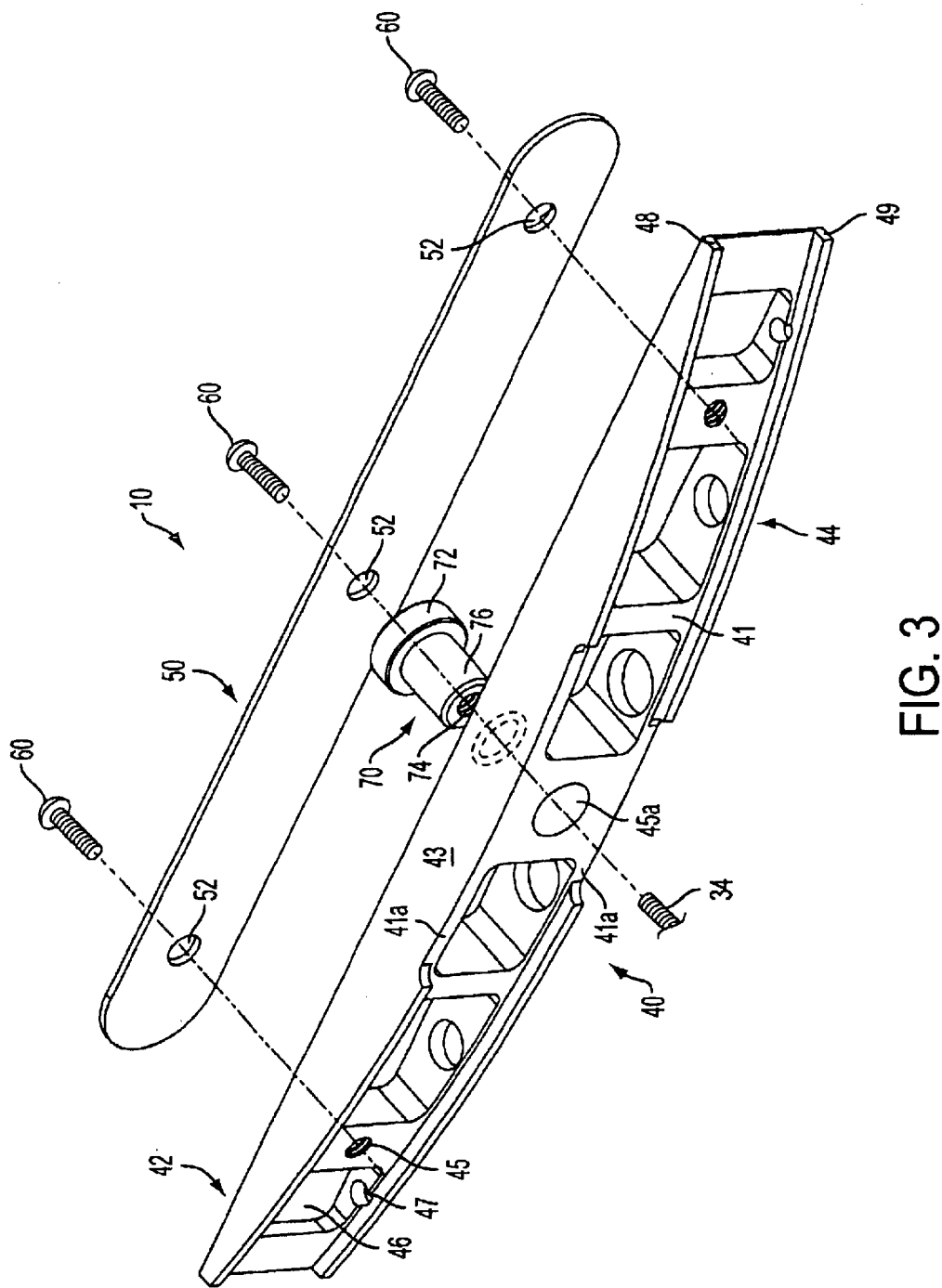
FIG. 3 is an isometric break away view of another embodiment of the mounting assembly according to the invention including a notched bag spacer, a modified shoulder bolt, a backer plate, and fastening means.

In embodiments where the bag spacer 40 is fastened to the windshield support bar 32 only by fastener 34 which extends from the center of the windshield support bar 32, the stability of the mounting may be enhanced by providing curved flange portions 48 and 49 to bag spacer 40 (see FIGS. 1–3). Flange portion 48 is provided on top surface 43 and flange portion 49 is provided on bottom surface 49. Flange portions 48, 49 extend from the curved side surface 41 of bag spacer 40 toward the support bar 32 of the windshield 30 in use. Flange portions 48, 49 straddle the support bar 32 along its upper and lower edges, and function to inhibit twisting of the mounted assembly 10 in the event that fastener 34 should loosen.

Backer plate 50 is a flat plate made of a metal or alloy, preferably stainless steel. Backer plate 50 is provided with a plurality of holes 52 through which fasteners 60 are inserted to fasten the backer plate 50 to the bag spacer 40 after the backer plate 50 is inserted into the windshield bag 20 to support, i.e., hang the same. Windshield bag 20 is provided with through holes 22 which are positioned and spaced apart so as to line up with the plurality of holes 52 of backer plate 50, and through which fasteners 60, which may be bolts or screws, such as machine screws, preferably phillips pan head machine screws, extend and permit fastening the backer plate 50 to the bag spacer 40. The hole 52 in the center of the backer plate 50 receives a fastener having a length which extends only partially into the center through hole 45 provided in the bag spacer 40. This permits fastener 34, which extends from support bar 32, to be threaded through the other side of the center through hole 45 provided in bag spacer 40.

FIG. 3 illustrates another embodiment of the mounting assembly according to the invention in which the elements are numbered the same and which is a variation designed to accommodate decorative hardware present on or integral to the windshield support bar of some vehicles. For example, the anniversary edition of motorcycles manufactured by Harley-Davidson Motor Company have decorative medallions displaying the Harley-Davidson logo integrated with the exterior and with the interior of the windshield support bars at their centers. The interior medallion has a threaded stud and a nut extending from it which can be used to mount conventional windshield bags.

According to a second embodiment of the present invention, the mounting assembly 10 is modified to accommodate the specific configuration of such a medallion and FIG. 3 shows modifications for this purpose. Since the interior medallion is integral to the interior support bar it cannot be removed and the curved side surface 41 of bag spacer 40 is provided with a notch 41a as shown in FIG. 3 in order to straddle and matingly engage the medallion or any other protruding structure on the support bar 32 of windshield 30. Further, the center through hole 45 of the bag spacer 40 is enlarged and counterbored, and is not threaded so that center through hole 45 is thus a central through bore 45a in this embodiment.

Central through bore 45a has a size sufficient to accommodate a modified shoulder bolt 70 which is included in this embodiment and has a counterbore provided in the flat side surface 42 of the bag spacer 40 (see the counterbore shown in phantom in FIG. 3). Modified shoulder bolt 70 has a head 72 provided with a hexagonal recess for tightening with an alien wrench and has an axial through bore 74 which is threaded and which extends the entire length of the shoulder bolt 70 including the head 72 and a shank portion 76.

Preferably the head 72 of the modified shoulder bolt 70 is not completely nested within the counterbore provided in the flat side surface 42 of the bag spacer 40 (shown in phantom in FIG. 3). The protruding portion of the head 72 then serves to receive a hole provided in the windshield bag 20 and provide a larger surface area for support of the windshield bag 20.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A vehicular windshield bag mounting assembly which permits mounting of a windshield bag having a generally planar structure onto a support bar of a curved windshield of a vehicle while maintaining the generally planar structure of the bag so that warping of the bag is substantially prevented, the vehicular windshield bag mounting assembly comprising, in combination
    a bag spacer having a curved side surface which engages the support bar of the curved windshield and a flat side surface;
    a backer plate which is flat, which is inserted into a windshield bag to support the windshield bag, and which is attached to the flat side surface of the bag spacer; and
    fastening means attaching the backer plate to the flat side surface of the bag spacer, and attaching the bag spacer to the support bar of the curved windshield.

2. The vehicular windshield bag mounting assembly according to claim 1, wherein the bag spacer and the backer plate are provided with respective pluralities of through holes through which fastening means extend.

3. The vehicular windshield bag mounting assembly according to claim 2, wherein the fastening means is at least one device selected from the group consisting of screws and bolts.

4. The vehicular windshield bag mounting assembly according to claim 1, wherein the fastening means is a plurality of machine screws.

5. The vehicular windshield bag mounting assembly according to claim 1, wherein the bag spacer is provided with a plurality of through cuts which extend from the curved side surface through the flat side surface in order to reduce the weight of the bag spacer.

6. The vehicular windshield bag mounting assembly according to claim 5, wherein the bag spacer includes a top surface and a bottom surface, and wherein a plurality of weep holes are provided in the bottom surface of the bag spacer through centers of respective ones of the plurality of through cuts for water drainage.

7. The vehicular windshield bag mounting assembly according to claim 1, wherein the fastening means comprising a first fastening means attaching the backer plate to the flat side surface of the bag spacer and a second fastening means for attaching the bag spacer to the support bar of the curved windshield and wherein the first fastening means and the second fastening measure different.

8. The vehicular windshield bag mounting assembly according to claim 1, wherein the fastening means which fastens the bag spacer to the support bar of the curved windshield is one of at least one screw or at least one bolt which extends from the support bar.

9. The vehicular windshield bag mounting assembly according to claim 1, wherein the bag spacer includes a top surface and a bottom surface, and wherein respective flange portions are provided on the top surface and on the bottom surface which extend from the curved side surface of the bag spacer toward the support bar of the windshield in use so that the flange portions straddle the support bar to provide positioning stability.

10. The vehicular windshield bag mounting assembly according to claim 1, wherein the mounting assembly further comprises a modified shoulder bolt having a head provided with a hexagonal recess and a longitudinal threaded bore defined there through, the modified shoulder bolt being accommodated substantially within the bag spacer for fastening the bag spacer to a threaded fastener which extends from the support bar of the windshield, and wherein the bag spacer further comprises a notch defined in the curved side surface at a center portion thereof and a central through bore which extends from the curved side surface through the flat side surface of the bag spacer, which has a diameter effective to receive the modified shoulder bolt, and a counterbore provided in the flat side surface which at least partially receives the head of the modified shoulder bolt.

11. A mounted vehicular windshield bag which has a generally planar structure and which is mounted onto a support bar of a curved windshield of a vehicle while maintaining the generally planar structure of the windshield bag so that warping of the bag is substantially prevented, comprising, in combination;
    a windshield bag having a generally planar structure; and
    the a vehicular windshield bag mounting assembly comprised of:
    a bag spacer having a curved side surface which engages the support bar of the curved windshield and a flat side surface;
    a backer plate which is flat, which is inserted into the windshield bag to support the windshield bag, and a which is attached to the flat side surface of the bag spacer; and
    a fastening means attaching the backer plate to the flat side surface of the bag spacer, and attaching the bag spacer to the support bar of the curved windshield.

12. A mounted vehicular windshield bag which has a generally planar structure and which is mounted onto a support bar of a curved windshield of a vehicle while maintaining the generally planar structure of the windshield bag so that warping of the bag is substantially prevented, comprising, in combination;

a windshield bag generally planar structure; and the a vehicular windshield bag mounting assembly comprised of:

a bag spacer having a curved side surface which engages the support bar of the curved windshield and a flat side surface;

a backer plate which is flat, which is inserted into the windshield bag to support the windshield bag, and a which is attached to the flat side surface of the bag spacer; and a fastening means attaching the backer plate to the flat side surface of the bag spacer, and attaching the bag spacer to the support bar of the curved windshield, wherein the bag spacer includes a top surface and a bottom surface, and wherein respective flange portions are provided on the top surface and on the bottom surface which extends from the curved side surface of the bag spacer toward the support bar of the windshield in use so that the flange portions straddle the support bar to provide positioning stability.

* * * * *